Figure 1:
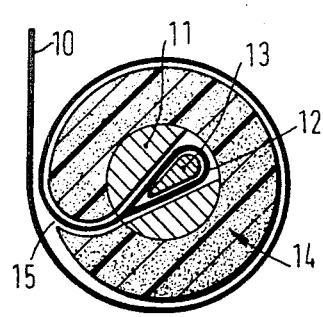

United States Patent [19]

Burleigh

[11] 4,256,273
[45] Mar. 17, 1981

[54] SAFETY BELT RETRACTORS

[75] Inventor: David W. Burleigh, Bognor Regis, England

[73] Assignee: Britax (Windgard) Limited, Chichester, England

[21] Appl. No.: 54,435

[22] Filed: Jul. 3, 1979

[30] Foreign Application Priority Data

Jul. 5, 1978 [GB] United Kingdom ............... 28844/78

[51] Int. Cl.³ ...................... A62B 35/00; B65H 75/48
[52] U.S. Cl. ........................... 242/107.4 R; 242/68.5; 297/472
[58] Field of Search ................. 242/107.4 R–107.4 E, 242/68.5, 118.2, 118.11; 280/803, 805, 806–808; 297/470, 471, 472, 476–480

[56] References Cited

U.S. PATENT DOCUMENTS

| 2,350,269 | 6/1944 | Sampair et al. | 242/68.5 |
| 2,394,639 | 2/1946 | Seem | 242/118.2 |
| 3,179,245 | 4/1965 | Bastian | 242/68.5 |
| 3,454,235 | 7/1969 | Hurley | 242/68.5 X |
| 3,881,667 | 5/1975 | Tandetzke | 242/107.4 A |
| 3,961,761 | 6/1976 | Wiesbock | 242/107.4 A |
| 4,045,079 | 8/1977 | Arlauskas et al. | 242/107.4 A |

Primary Examiner—John M. Jillions
Attorney, Agent, or Firm—Kemon & Estabrook

[57] ABSTRACT

A safety belt retractor has a spindle 11 provided with an outer layer 14 formed of a material which is capable of absorbing energy by substantially inelastic deformation. When the safety belt 10 is subject to shock-loading exceeding a predetermined level, this outer layer 14 is crushed, leading to a reduction in the effective diameter of the spindle 11 and thereby allowing an additional length of the belt 10 to be paid out after the spindle 11 has been loaded.

6 Claims, 5 Drawing Figures

SAFETY BELT RETRACTORS

This invention relates to the field of safety restraint apparatus and it may be employed in a safety belt retractor to be fitted to a vehicle for restraining an occupant subjected to an accelerational force. More particularly, the invention relates to a safety belt retractor comprising a rotatable member on which a safety belt is stored, a rewinding spring drivably connected to the rotatable member, a locking mechanism which is inertia responsive or belt extraction responsive to arrest the rotatable member, and means for absorbing energy to reduce the shock-loading on the belt when the locking mechanism has arrested the rotatable member and the body of the belt user, subjected to an accelerational force, is restrained by the belt.

It is known to provide energy absorbing means in safety belt retractors for the latter mentioned purpose. For example, a spindle on which a safety belt is wound can be connected to a screw threaded device to cause an energy absorbing element to be deformed after the locking mechanism has operated and a predetermined belt loading has been exceeded, see U.K. Patent Specifications Nos. 1,324,667 and 1,327,612, and U.S. Pat. Nos. 3,442,466 and 3,961,761. As an alternative to compressive deformation, a torsion bar may be deformed on exceeding the predetermined belt loading as taught in U.S. Pat. No. 3,741,494. It is also known to employ a slipping clutch or friction pads to absorb energy on exceeding the predetermined belt loading as taught in, for example, U.S. Pat. Nos. 3,790,099 and 3,666,198 respectively.

The known devices are, of course, useful in providing additional protection to the user of a safety belt. However, their construction adds to the expense of manufacturing a safety belt retractor due to the increased number of parts and their assembly. Moreover, if a deformable energy absorbing element is located in an inaccessible part of a safety belt retractor, the user may not be aware of the extent that the element has been deformed due to a previous shock-loading or loadings. Expense would also be incurred in servicing or replacing a retractor in which an energy absorbing element has been drastically deformed due to the shock-loading imposed in an accident.

The problem facing the present invention is to provide a safety belt retractor with relatively inexpensive means for absorbing energy due to a shock-loading. There is also the problem of indicating that a shock-loading has been exceeded and of facilitating replacement of the energy absorbing means.

According to the invention, there is provided a safety belt retractor having a locking mechanism and a spindle on which a safety belt is wound, the part of the spindle in contact with the belt being formed of energy absorbing material which is capable of absorbing energy by substantially inelastic deformation, such deformation permitting extraction of the belt from the retractor when rotation of the spindle is inhibited by the locking mechanism and a predetermined belt loading is exceeded.

Preferably, the energy absorbing material is such that some elastic deformation is possible with a belt loading below the predetermined value. On exceeding this value, further deformation is substantially inelastic. An example of such material is foamed plastics. The sleeve may be in the form of a uniform layer of material, or in the form of a series of compressively deformable cells. Preferably, the layer or sleeve is accessable or visible so as to provide an indication that it is in a suitable condition for use.

Figure 2:
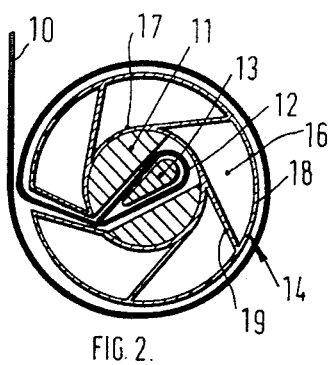
Figure 3:
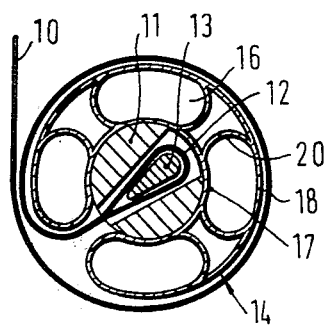
Figure 4:
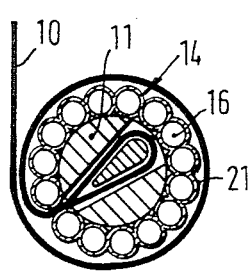
Figure 5:
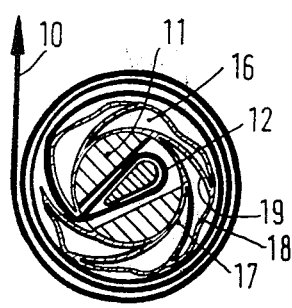

Certain embodiments of the invention will now be described, by way of example, with reference to the accompanying schematic drawings in which:

FIGS. 1 to 4 are cross-sectional views each showing a rotatable member supporting a sleeve or layer of deformable material on which the end of a safety belt is wound, and FIG. 5 illustrates the embodiment of FIG. 2 in which the sleeve of material has been deformed by a shock-loading.

Referring to the accompanying drawings, in each embodiment of the invention, an end portion of a safety belt 10 is secured to a spindle 11 by means of a locking loop 12. The locking loop 12 is formed by passing the belt though the narrower side of a wedge-shaped slot through the member 11 and then doubling over the end of the belt to form a loop of the belt material. A wedge-shaped pin 13 is then inserted in the material loop and the belt is drawn back through the slot so that the pin 13 is wedged in the slot. The spindle 11 is supported, in known fashion, in bearings in a frame (not shown) of the safety belt retractor. A rewinding spring (not shown) has one end anchored to the frame and its other end secured to the spindle 11. A rachet wheel (not shown) fast with the spindle 11 is engaged by a locking pawl (not shown) forming part of a known inertia responsive or belt retraction responsive locking mechanism (also not shown). The parts of the retractor not shown in the drawing are well known in the art and therefore do not require particular illustration or description.

In the embodiment shown in FIG. 1, the spindle 11 is covered by a layer or sleeve 14 of foamed plastics material, such as high density expanded polystyrene, for example of density 50 to 80 Kg/m$^3$, or expanded polyvinyl chloride with a suitable plasticizer. The layer 14 has a slot 15 through which is led a portion of the safety belt 10. The belt 10 is then wound around the layer 14 before passing out of the retractor casing (not shown). The belt portion passing out of the retractor casing preferably forms the so called "lap and diagonal part" of the safety belt 10, the terminal end being anchored to the body of the vehicle. The lap and diagonal parts form a loop which is releasably secured by a known fastener or buckle to a second anchor point in the vehicle. Again, the parts of the belt which are not illustrated in the drawing are well known in the art and require no particular illustration or description.

When the belt has been fastened about the user's body, the lap and diagonal parts restrain the user, when subjected to an accelerational force, because the locking mechanism operates to prevent rotation of the spindle 11. Under normal circumstances, when a predetermined belt loading is not exceeded, the tension in the belt 10 produces only a slight elastic deformation of the material in the sleeve or layer 14. However, when the predetermined belt loading is exceeded, as in an accident, the sleeve or layer 14 is compressibly deformed beyond its elastic limit and hence absorbs some of the energy of the shock loading imposed on the user. The predetermined belt loading may be exceeded with a vehicle deceleration which is, for example, in excess of 10 g. When the layer 14 is deformed by the excess loading, its diameter is gradually reduced thereby allowing a further portion of the belt 10 to be pulled out from the retractor. The effect is that of an energy absorber which reduces undesirable peak g loading on the wearer in the case of an accident.

In the embodiments of FIGS. 2 and 3, the sleeve 14 is made from plastics material which is formed into a series of compressively deformable cells 16. In FIG. 2, the sleeve 14 comprises inner and outer cylinders 17, 18 connected by radial webs or spokes 19. Such cylinders 17, 18 are also used in the construction shown in FIG. 3 but, in this case, they are separated by oppositely curved radial webs or spokes 20. In both cases, the sleeve may be formed from a thermoacetal or semi-rigid PVC.

In FIG. 4, the sleeve 14 comprises a series of hollow cylindrical elements 21 extending around the circumference of the rotatable member 12. The elements 21 comprise loaded plasticized PVC tubular extrusions which are radio-frequency welded edge to edge and cut to the required width and length to surround the spool.

FIG. 5 schematically illustrates compressive deformation of the sleeve 14 of the embodiment shown in FIG. 2 when a predetermined belt loading has been exceeded. Generally, the cells 16 collapse under the circumferential pressure exerted by the turn or winding of the belt 10 when the predetermined loading is exceeded.

After an accident, it is merely necessary to remove the belt cover (if any) of the retractor in order to inspect the spindle 10 to determine whether inelastic deformation of the layer 14 has taken place. There is no need to dismantle the locking mechanism for this purpose.

I claim:

1. A spindle for a safety belt retractor having a locking mechanism, said spindle comprising a rigid core and a radially outer layer formed of energy absorbing material which is capable of absorbing energy by substantially inelastic deformation, a safety belt wound on said radially outer layer and means for attaching an end of said safety belt to said core, whereby deformation of said radially outer layer permits extraction of the belt from the retractor when rotation of the spindle is inhibited by the locking mechanism and a predetermined belt loading is exceeded.

2. A spindle according to claim 1, wherein said energy absorbing material is a foamed plastics material.

3. A spindle according to claim 1, wherein said energy absorbing material comprises a series of compressively deformable cells.

4. A safety belt retractor comprising a locking mechanism, a spindle having a rigid core and a radial outer layer formed of energy absorbing material which is capable of absorbing energy by substantially inelastic deformation, a safety belt wound on said radially outer layer and means for attaching an end of said safety belt to said core, whereby deformation of said radially outer layer permits extraction of the belt from the retractor when rotation of the spindle is inhibited by the locking mechanism and a predetermined belt loading is exceeded.

5. A retractor according to claim 4, wherein said energy absorbing material is a foam plastics material.

6. A retractor according to claim 4, wherein said energy absorbing material comprises a series of compressively deformable cells.

* * * * *